United States Patent
Alrod et al.

(10) Patent No.: US 11,194,489 B2
(45) Date of Patent: Dec. 7, 2021

(54) ZONE-BASED DEVICE WITH CONTROL LEVEL SELECTED BY THE HOST

(71) Applicant: Western Digital Technologies, Inc., San Jose, CA (US)

(72) Inventors: Idan Alrod, Herzliya (IL); Shay Benisty, Beer Sheva (IL); Ariel Navon, Revava (IL); Judah Gamliel Hahn, Ofra (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/859,940

(22) Filed: Apr. 27, 2020

(65) Prior Publication Data
US 2021/0334022 A1    Oct. 28, 2021

(51) Int. Cl.
*G06F 3/06* (2006.01)
*G06F 11/10* (2006.01)

(52) U.S. Cl.
CPC .......... *G06F 3/0632* (2013.01); *G06F 3/0604* (2013.01); *G06F 3/0616* (2013.01); *G06F 3/0652* (2013.01); *G06F 3/0673* (2013.01); *G06F 11/1076* (2013.01)

(58) Field of Classification Search
CPC ..... G06F 3/0673; G06F 3/0632; G06F 3/0604
See application file for complete search history.

(56) References Cited

U.S. PATENT DOCUMENTS

| | | | |
|---|---|---|---|
| 8,745,309 B2 | 6/2014 | Jung et al. | |
| 9,542,118 B1 * | 1/2017 | Lercari | G06F 12/1009 |
| 9,710,377 B1 | 7/2017 | Kuzmin et al. | |
| 10,552,058 B1 * | 2/2020 | Jadon | G06F 3/0655 |
| 2014/0215129 A1 * | 7/2014 | Kuzmin | G06F 12/0246 711/103 |
| 2019/0095110 A1 | 3/2019 | Watt | |
| 2019/0220192 A1 | 7/2019 | Falanga et al. | |

(Continued)

OTHER PUBLICATIONS

Bjorling, Matias. From Open-Channel SSDs to Zoned Namespaces, Jan. 23, 2019, retrieved from <https://www.usenix.org/sites/default/files/conference/protected-files/nsdi19_slides_bjorling.pdf>, 18 pages.

(Continued)

*Primary Examiner* — Edward J Dudek, Jr.
(74) *Attorney, Agent, or Firm* — Patterson & Sheridan, LLP; Steven H. Versteeg

(57) ABSTRACT

The present disclosure generally relates to a flexible or soft architecture solution of a host-data storage device system. The host is permitted different, intermediate levels of responsibility to the memory management. The different levels of host involvement in the memory management of the memory device are anywhere between an existing zone namespace (ZNS) solution and an open channel solution. The data storage device offers a selection of specific memory management options to the host device. The host device then selects the level of memory management desired and configures the data storage device to meet the memory management selection. In so doing, the host device controls the trade-off between host device overhead of memory management and host device flexibility.

20 Claims, 5 Drawing Sheets

(56) References Cited

U.S. PATENT DOCUMENTS

2021/0117117 A1* 4/2021 Mahesh .............. G06F 3/0688

OTHER PUBLICATIONS

International Search Report and the Written Opinion for International Application No. PCT/US2020/064916, dated Feb. 22, 2021, 9 pages.
Radian Memory Systems; "Cooperative Flash Management"; Zoned Namespaces, http://www.radianmemory.com/wp-content/uploads/2019/08/Radain_ZNS_Product_Overview_8-19_v1.pdf (12 pages).
Du, Yu et al.; "In Pursuit of Optimal Storage Performance: Hardware/Software Co-Design with Dual-Mode SSD" Alibaba Group; https://technodocbox.com/Computer_Peripherals/98531019-In-pursuit-of-optimal-storage-performance-hardware-software-co-design-with-dual-mode-ssd.html (23 pages).

\* cited by examiner

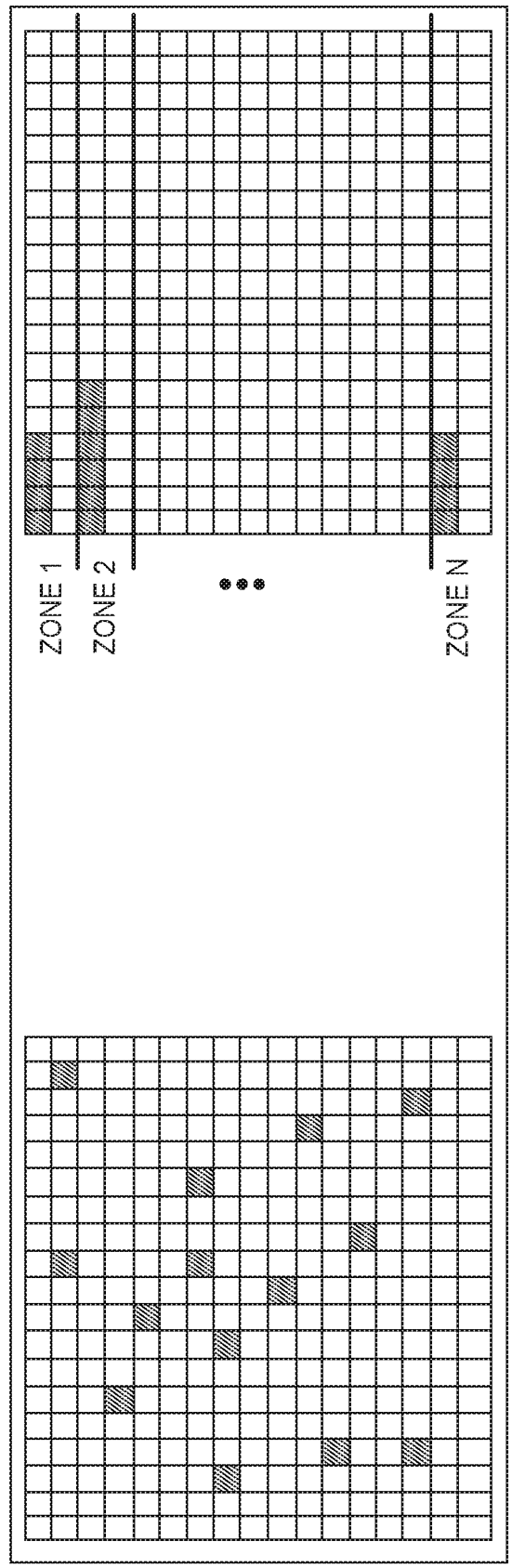

ZONE-BASED DEVICE WITH CONTROL LEVEL SELECTED BY THE HOST

BACKGROUND

Field of the Disclosure

Embodiments of the present disclosure generally relate to allowing a tradeoff between host overhead of memory management and host flexibility according to host specific needs.

Description of the Related Art

Zoned namespaces (ZNS) are a new direction in storage in which the data storage device restricts writes to sequential zones. ZNS is intended to reduce device side write amplification and overprovisioning by aligning host write patterns with internal device geometry and reducing the need for device side writes which are not directly linked to a host write.

ZNS offers many benefits including: reduced TCO due to minimal DRAM requirements per SSD; potential savings due to decreased need for overprovisioning of NAND media; better SSD lifetime by reducing write amplification; dramatically reduced latency; significantly improved throughput; and having a standardized interface enables a strong software and hardware exo-system.

In an open channel environment, the host device performs many aspects of flash management across multiple devices, and the device represents its internal geometry to the host device. Both ZNS and open channel architectures provide solutions at which the host device has enhanced responsibilities on a data storage device, for the sake of reduced device-side write amplification and overprovisioning. The main difference between ZNS and open channel architectures is that in open channel, the host device is aware of the physical structure of the data storage device (e.g., number of channels, dies, planes, and blocks) and it is the host device responsibility to handle memory maintenance such as garbage collection, data relocations, etc. The zone abstraction may be mapped directly or indirectly to a specific device structure.

ZNS and open channel pose two different solutions, each with a fixed level of control of the host device on the data storage device. Each of these approaches suffers from related drawbacks. For open channel, there is more flexibility for the host device at the expense of higher host device overhead of memory maintenance. For ZNS, the host responsibility to memory maintenance is reduced, but the host device is forced to obey strict limitations of the write modes on the ZNS.

Therefore, there is a need in the art for a flexible system architecture solution that allows a trade-off between host device overhead of memory management and host device flexibility according to host specific needs.

SUMMARY

The present disclosure generally relates to a flexible or soft architecture solution of a host-data storage device system. The host is permitted different, intermediate levels of responsibility to the memory management. The different levels of host involvement in the memory management of the memory device are anywhere between an existing zone namespace (ZNS) solution and an open channel solution. The data storage device offers a selection of specific memory management options to the host device. The host device then selects the level of memory management desired and configures the data storage device to meet the memory management selection. In so doing, the host device controls the trade-off between host device overhead of memory management and host device flexibility.

In one embodiment, a data storage device comprises: a memory device; and a controller coupled to the memory device, wherein the controller is configured to: deliver a list of supported features to a host device, wherein the list of supported features includes wear level handling, garbage collection, data-tagging, read-scrub; and update of management tables; receive a selection of the supported features from the host device; and configure the data storage device in accordance with the selected supported features.

In another embodiment, a data storage device comprises: a memory device; and a controller coupled to the memory device, wherein the controller is configured to: deliver a selection of configurations to a host device, wherein the selection of configurations includes an open channel configuration, a zone namespace (ZNS) configuration, and a configuration in between the ZNS configuration and the open channel configuration.

In another embodiment, a data storage device comprises: a memory device; a controller coupled to the memory device; means to receive a host device instruction to configure the data storage device in a configuration selected by the host device, wherein prior to receiving the host device instruction, the data storage device is capable of operating in either of an open channel configuration, a ZNS configuration or a configuration between the open channel configuration and the ZNS configuration; and means to configure the data storage device to be able to operate the configuration selected by the host device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 2A is a schematic illustration of a traditional block storage device.

FIG. 2B is a schematic illustration of a zoned block storage device.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a flexible or soft architecture solution of a host-data storage device system. The host is permitted different, intermediate levels of responsibility to the memory management. The different levels of host involvement in the memory management of the memory device are anywhere between an existing zone namespace (ZNS) solution and an open channel solution. The data storage device offers a selection of specific memory management options to the host device. The host device then selects the level of memory management desired and configures the data storage device to meet the memory management selection. In so doing, the host device controls the trade-off between host device overhead of memory management and host device flexibility.

Figure 1:
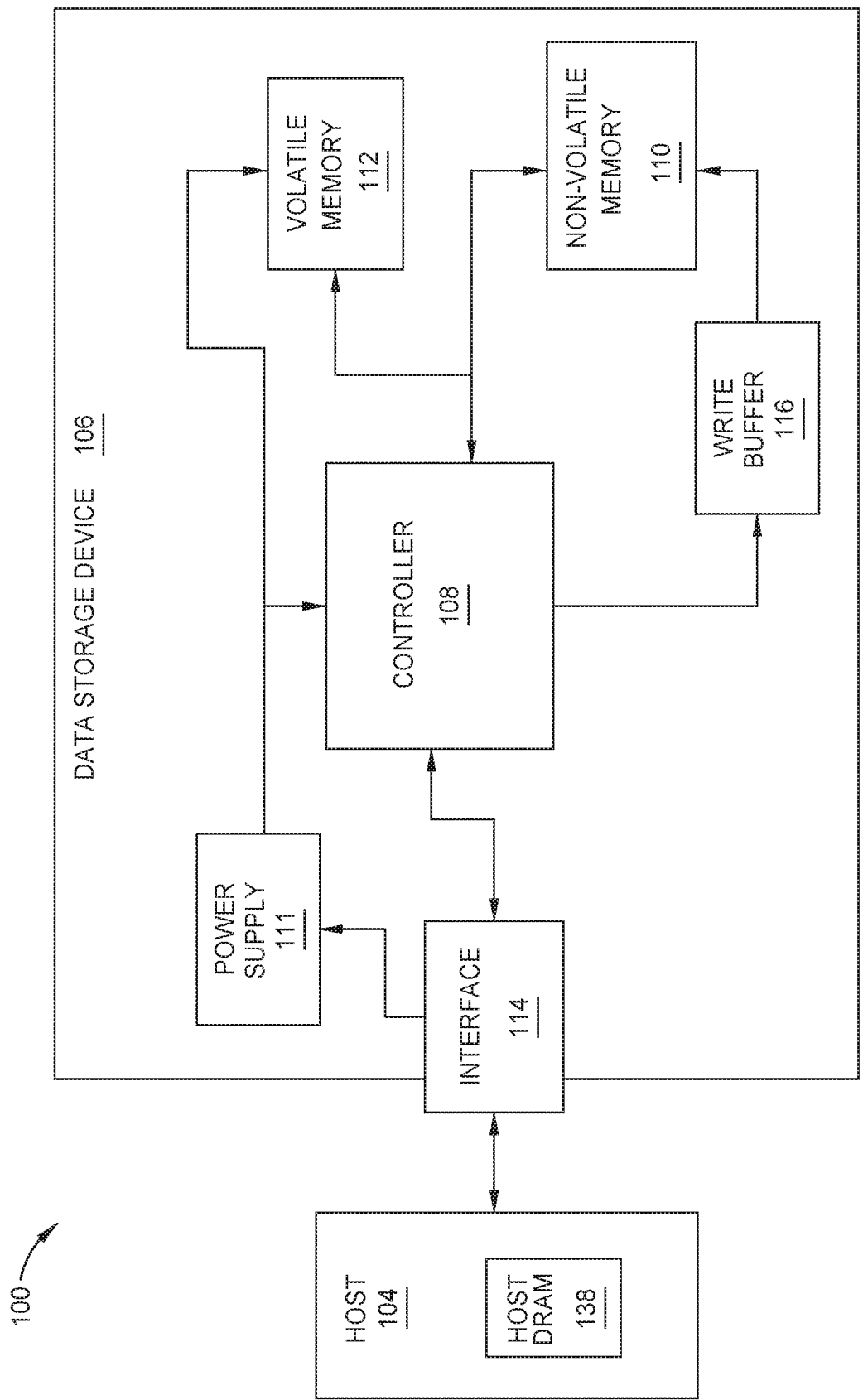
FIG. 1 is a schematic block diagram illustrating a storage system having a storage device that may function as a storage device for a host device, in accordance with one or more techniques of this disclosure.

FIG. 1 is a schematic block diagram illustrating a storage system 100 in which data storage device 106 may function as a storage device for a host device 104, in accordance with one or more techniques of this disclosure. For instance, the host device 104 may utilize NVM 110 included in data storage device 106 to store and retrieve data. The host device 104 comprises a host DRAM 138 that comprises a read buffer 140. The read buffer 140 may be used to store read commands to be sent to the data storage device 106. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The storage system 100 includes a host device 104 which may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

The data storage device 106 includes a controller 108, non-volatile memory 110 (NVM 110), a power supply 111, volatile memory 112, an interface 114, and a write buffer 116. In some examples, the data storage device 106 may include additional components not shown in FIG. 1 for sake of clarity. For example, the data storage device 106 may include a printed board (PB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like, provided that these protocols support zoned namespace abstractions. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the data storage device 106 to receive power from the host device 104. For example, as illustrated in FIG. 1, the power supply 111 may receive power from the host device 104 via the interface 114.

The data storage device 106 includes NVM 110, which may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM)

devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. Flash memory devices may include NAND or NOR based flash memory devices, and may store data based on a charge contained in a floating gate of a transistor for each flash memory cell. In NAND flash memory devices, the flash memory device may be divided into a plurality of blocks which may be divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Furthermore, NAND flash memory devices may be 2D or 3D devices, and may be single level cell (SLC), multi-level cell (MLC), triple level cell (TLC), or quad level cell (QLC). The controller 108 may write data to and read data from NAND flash memory devices at the page level and erase data from NAND flash memory devices at the block level.

The data storage device 106 includes a power supply 111, which may provide power to one or more components of the data storage device 106. When operating in a standard mode, the power supply 111 may provide power to the one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may be comprised of one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the data storage device 106 receives a write command from the host device 104, the controller 108 temporarily stores the data associated with the write command in the internal memory or write buffer 116 before sending the data to the NVM 110.

FIGS. 2A and 2B are schematic illustrations of a block storage device, according to various embodiments. In one embodiment, the block storage device of FIG. 2A and FIG. 2B may be the NVM 110 of the data storage device 106 of FIG. 1. Furthermore, according to various embodiments, the block storage device of FIG. 2A and FIG. 2B may be a multi-level cell, such as SLC, MLC, TLC, QLC, or any other iteration of multi-level cell not listed. Each square of the block storage device of FIG. 2A and FIG. 2B represents a block available for data storage. A shaded square or block denotes that the block comprises data. The data may be user data, XOR or parity data, device metadata, or any other suitable data to be stored in the block storage device.

FIG. 2A is a schematic illustration of a traditional block storage device. In a traditional block storage system, data is written sequentially to the storage device. However, the data may be inefficiently written to the drive resulting in a decrease in the working or effective capacity of the drive. In FIG. 2A, data has been written to blocks scattered throughout the block storage device. In order to overcome the inefficient writes to the drive, the block storage system may be over-provisioned so that the exposed capacity (i.e., capacity available for data) is similar to an efficiently written block storage device capacity. The increased capacity of the storage device and the inefficient writes to the storage device may require a large mapping table, such as a logical to physical (L2P) table, within the volatile memory, such as the volatile memory 112 of FIG. 1, to store the location of the data within the block storage device. The large mapping table may require a high capacity volatile memory 112, which may be cost inefficient or expensive.

FIG. 2B is a schematic illustration of a zoned block storage device. The zoned block storage device is partitioned into various zones, where the Nth zone corresponds to the last zone in the storage device and the capacity of each zone is equal. In another embodiment, the zoned block storage device is partitioned into various streams, where the capacity of each stream is different. In the zoned block storage system, the system comprises firmware, such as the ZNS. ZNS restricts data writes to be sequentially within a zone. In FIG. 2B, data has been written to the first four blocks sequentially of zone 1, to the first six blocks sequentially of zone 2, and to the first four blocks sequentially of zone N. Since ZNS restricts data writes to be sequentially within a zone, the capacity of each zone is optimized. Thus, the usable capacity of the storage device (i.e., available capacity for data) is increased instead of having to over-provision the storage device to maintain the same amount of usable capacity. The better utilization of the available capacity for data of the zoned block storage device may decrease the size of the mapping table or the L2P table stored in the volatile memory 112, which may decrease the volatile memory 112 size required.

Figures 3A, 3B:
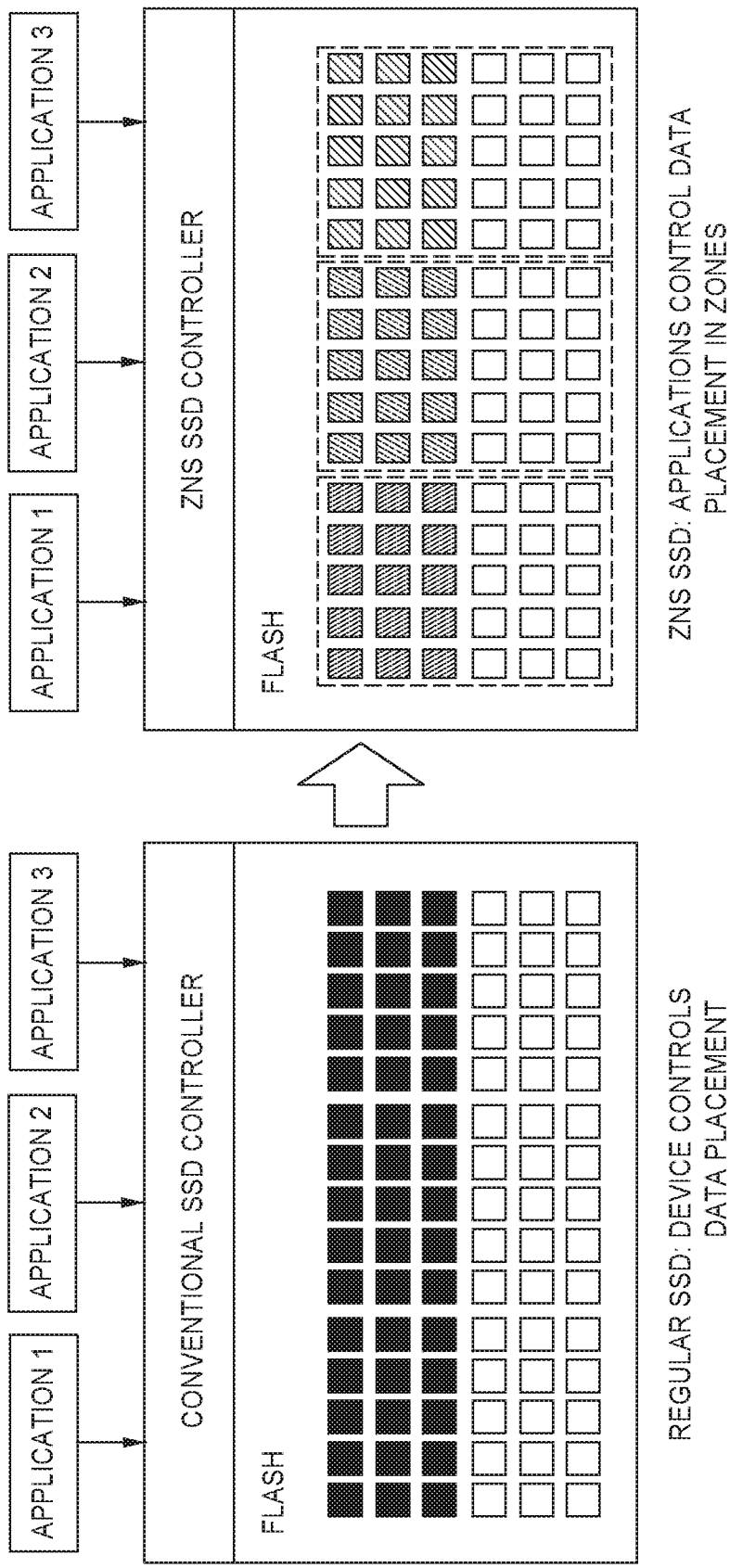
FIG. 3A is a schematic illustration of device control of a traditional SSD.
FIG. 3B is a schematic illustration of device control of a ZNS SSD.

FIGS. 3A and 3B are schematic illustrations of device control of a SSD, according to various embodiments.

Aspects of FIGS. 2A and 2B may be applicable to the understanding of FIGS. 3A and 3B. In one embodiment, the flash device of FIG. 3A and FIG. 3B may be the NVM 110 of the data storage device 106 of FIG. 1. Furthermore, according to various embodiments, the flash device of FIG. 3A and FIG. 3B may be a multi-level cell, such as SLC, MLC, TLC, QLC, or any other iteration of multi-level cell not listed. Each square of the block storage device of FIG. 3A and FIG. 3B represents a block available for data storage. A shaded square or block denotes that the block comprises data. The data may be user data, XOR or parity data, device metadata, or any other suitable data to be stored in the flash of the SSD.

FIG. 3A is a schematic illustration of device control of a traditional SSD. The SSD receives data from multiple applications, such as Application 1, Application 2, and Application 3. The data is stored in the flash of the SSD. In the SSD, the storage device controls the data placement. Data is written sequentially to the flash so that the data from each application may be written in the order that the data is received. Because the data from each application may be random throughout the sequential writes, endurance and device lifetime may be negatively impacted. ZNS devices tend to have a lower throughput comparatively because there is less parallelism when zones are accessed individually. However, the fact that all writes in a zone are sequential, and that a zone can only be reset all at once means that no garbage collection is necessary and autonomous writes are less, which yields better write amplification and longer device lifetime.

FIG. 3B is a schematic illustration of device control of a ZNS SSD. Similar to FIG. 3A, the SSD receives data from multiple applications, such as Application 1, Application 2, and Application 3. The data is stored in the flash of the SSD. In the SSD, the applications or the host, such as the host device 104 of FIG. 1, controls the data placement in the zones. The flash of the SSD is partitioned into various equal capacity zones. The zones may be considered parallel units, in which the host device 104 may direct workloads or data to a specific parallel unit (i.e., the host has block access of the flash). For example, the data associated with Application 1 is located in a first zone, while the data associated with Application 2 is located in a second zone and the data associated with Application 3 is located in a third zone. Due to the zone provisioning, endurance and device lifetime may improve compared to traditional SSD devices.

Figure 4:
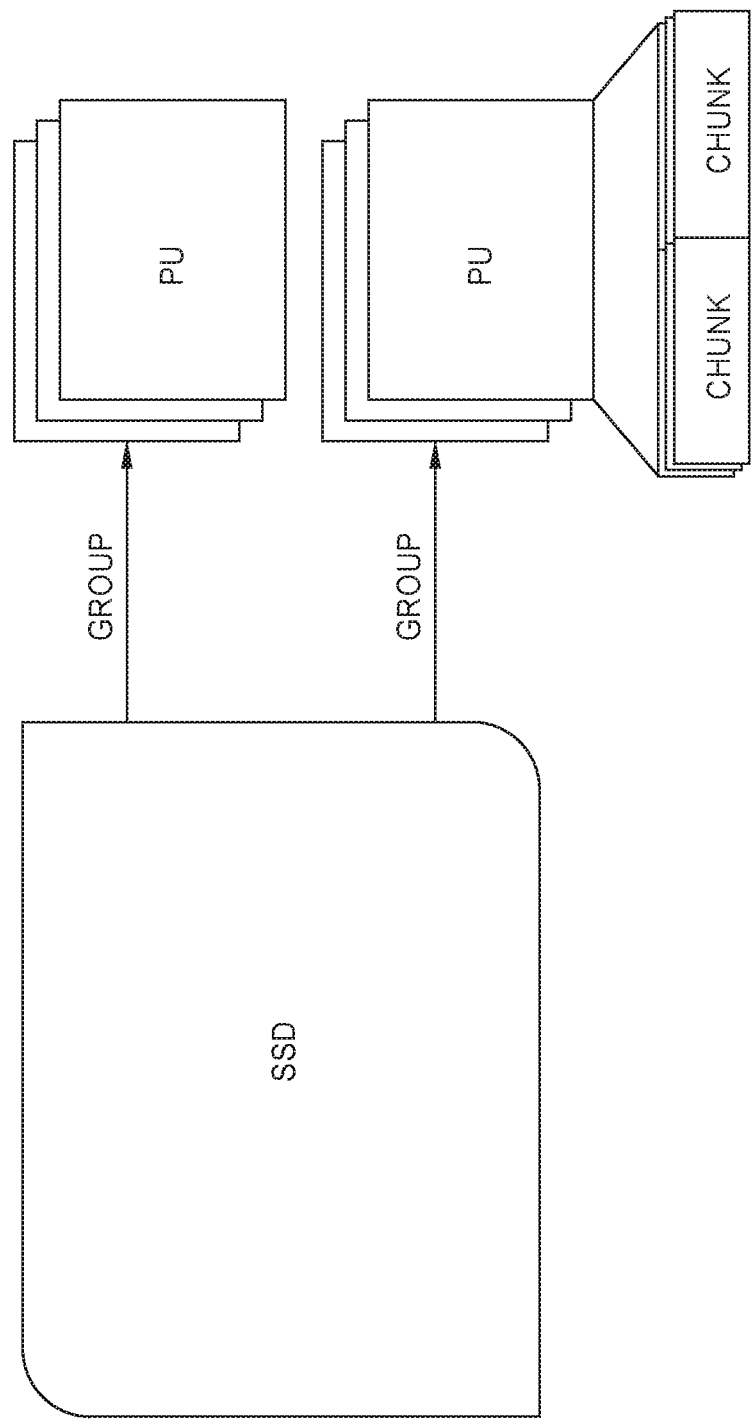
FIG. 4 is a schematic illustration of open channel logical parallelism in an SSD.

In an open channel environment, the host device performs many aspects of flash management across multiple data storage devices, and the data storage devices represent their internal geometry to the host device. FIG. 4 is a schematic illustration of open channel logical parallelism in an SSD. In FIG. 4, the structure is divided into Groups, Parallel Units (PUs), Chunks, and logical blocks. A group is a shared bus within the open channel SSD where bandwidth and transfer overhead (PCIe, controller, DRAM, no blocking between read/write/reset) are shared between the PUs attached. A PU is the unit of parallelism within the SSD, and the PU access is fully independent of other PUs. For example, if a write is issued to one PU, another PU should not be busy, other than the delay introduced by sharing the same group. Note that the representation is not necessarily the physical media attachments and can be a logical representation. Within PUs, there is a set of chunks. The chunks represent a linear range of logical blocks. The chunks require that writes to the chunks are issued sequentially and that a chunk is reset before being written to again.

As noted above, ZNS requires minimal involvement of the host device in the data storage device management on the one hand, but on the other hand forces strict limitations on the host device such as writing only large chunks of data in a sequential manner. The open channel solution allows much more flexibility to the host device on the expense of almost full responsibility of the host device to handle the memory maintenance.

As discussed herein, a configurable, graded host-memory management architecture is disclosed that will allow the host device to choose a "soft" level of memory management that the host device wants to handle. The data storage device will support these multi-options of memory management according to the host device configuration. The configuration of the host interference level could be static or, in one embodiment, dynamic.

In a manner of speaking, the data storage device will present a "menu" of options for memory management. The options range anywhere from open channel configuration where the host device handles the vast majority of memory management, to ZNS whereby the data storage device will handle the vast majority of memory management, and everywhere in between. The host device can select from the "menu" of memory management options. The host device can select the memory management options that the host device will manage and thus leave the remaining memory management options for the data storage device to manage. Alternatively, the host device can select the memory management options that the data storage device will manage and leave the remaining memory management options for the host device to manage. In any event, the memory management can be customized or tailored to suit the specific needs of the host device by permitting the host device to select the memory management level desired. Furthermore, the host device could, if desired, change the memory management distribution could be changed. Though expected to be rare, it is contemplated that the host device could want to change the memory management distribution and thus initiate a request to the data storage device to present the menu again. To make such a change, the data storage device could receive the request at any time, but then present the "menu" during the next idle time for the data storage device. While unlikely, it is contemplated that a dynamic change in memory management is possible whereby the "menu" is presented while the data storage device is not idle.

There are many features that can be managed either by the data storage device or by the host device. One of the operations is wear level handling, which is balancing the level of program/erase counts of the physical blocks along the whole data storage device. Another operation is garbage collection which is the rearrangement of the data along the data storage device as to gather related data together and avoid fragmented data ordering. Another operation is data-tagging, which is cross-temperature leveling, data reliability, cold/hot level (i.e., access frequency and data importance). Still another operation is read-scrub, which is refreshing the stored data to reduce errors due to several memory disturbs such as data-retention. Another operation is updating the management tables while another operation is error-correction codes (ECC) which is encoding and decoding data. ECC would preferably stay on the memory controller level in the data storage device, but could be done from the host device if desired.

As discussed herein, the host device is presented with a menu of options for memory management which varies from open channel management to ZNS management with everything therebetween. The menu provides different predefined combinations of memory management operations to be done either by the data storage device or the host device. The data storage device presents the memory management options to the host device, and the host device selects which level of memory management desired. The table below illustrates several options that can be presented to the host device by the data storage device. It is contemplated that the individual options discussed above can be presented to the host device or preset combinations of the individual options can be presented to the host device.

TABLE

| | Wear Level Handling | Garbage Collection | Data-Tagging | Read-Scrub | Update of Management Tables |
|---|---|---|---|---|---|
| Option 1 | Host | Host | Host | Host | Host |
| Option 2 | Device | Device | Host | Device | Device |
| Option 3 | Host | Device | Host | Device | Device |
| Option 4 | Host | Device | Host | Device | Device |
| Option 5 | Device | Device | Device | Device | Device |
| Option 6 | Host | Host | Host | Host | Device |
| Option 7 | Device | Device | Device | Host | Device |

It is to be understood that while seven options have been shown in the Table, other options are also contemplated. Indeed, generally speaking, any combination of the wear level handling, garbage collection, data-tagging, read-scrub, and update of management tables is contemplated. It is also to be understood that there could be sub-dividing to a higher granularity such that part of the data tagging could be done by the host and another part by the data storage device controller. The configuration of the host management level could be static, meaning that the host management level would not be changed after booting. However, it is contemplated that the host management level could be dynamic such that the host device could trigger the data storage device to use other such interference options out of the pre-defined list that both the host device and data storage device will support. The embodiments discussed herein include handling of several partitions inside the same memory array, else several different dies, or different memory devices of a data storage device that are connected together to the same host device at which each partition/die/device will be handed by the host device in a different interference level.

Figure 5:
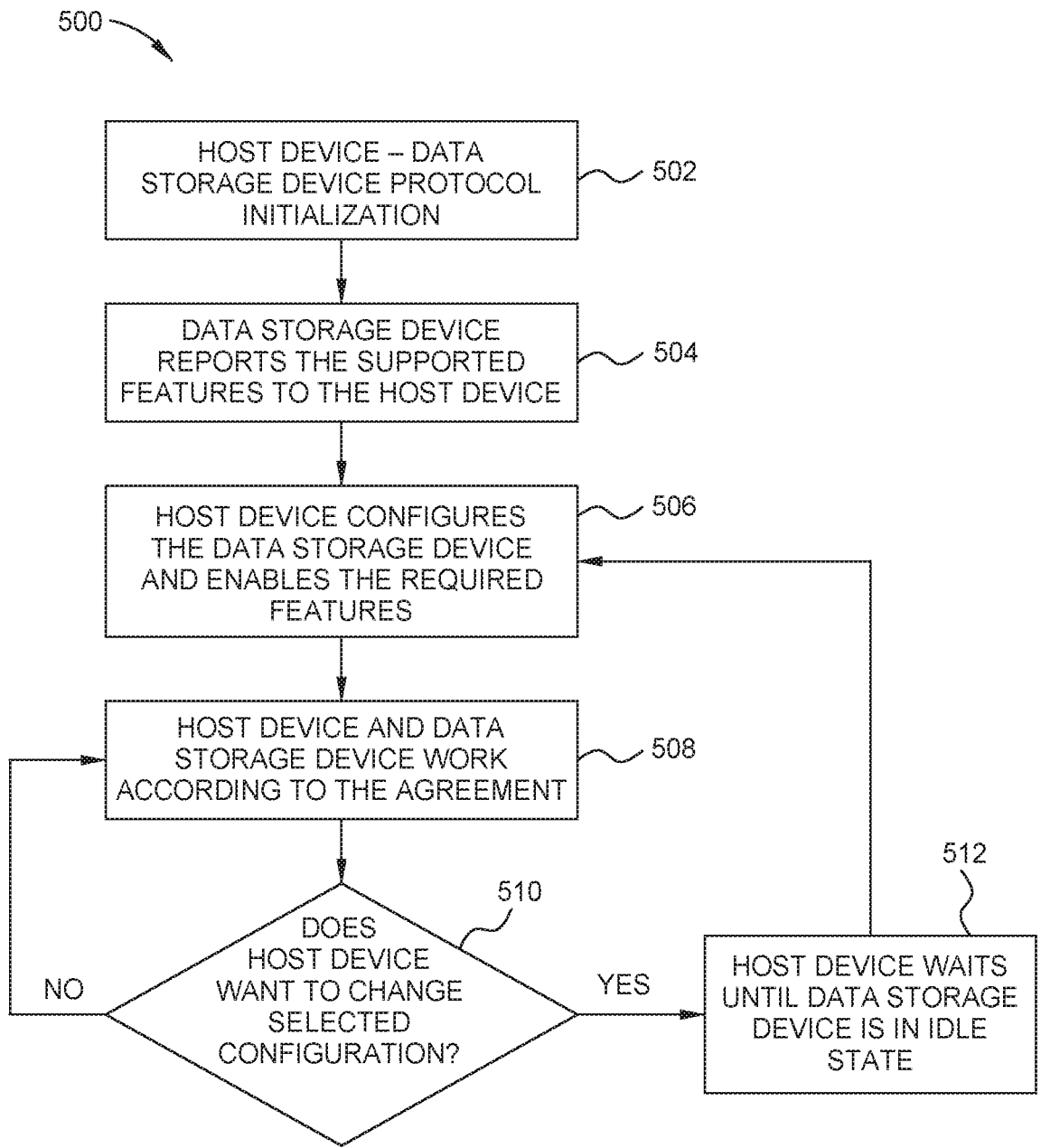
FIG. 5 is a flowchart illustrating method of allowing a host to adjust configurations according to host specific needs.

FIG. 5 is a flowchart illustrating method of allowing a host device to adjust configurations according to host specific needs. As part of the host-device protocol (e.g., NVMe) initialization in block 502, the data storage device reports the data storage device capability and flexibility support to the host device in block 504. For example, the data storage device reports to the host device the supported and non-supported features (i.e., from the Table above or on an individual option basis). Then, the host device configures the data storage device by enabling the desired features in block 506. The host device and the data storage device then work in accordance with the configuration in block 508. At some point in time, the host device may desire changing the configuration in block 510 and thus needs to wait until the data storage device is in an idle state in block 512 before the reconfiguring begins.

The menu of options provided to the host device by the data storage device provides the host device with greater flexibility to maneuver the trade-off between the host device's flexibility to operate the data storage device memory and the resulted overhead in memory management related operations. When the options can be changed and adapted to the current state of the system, the ability to choose options can save power and increase the performance. For example, the host device usually writes big chunks of sequential data, but in some scenarios, the host device needs random write access. Thus, the system may switch to an open-channel mode for those rare write commands and go back to ZNS mode thereafter.

By providing a selection of specific memory management options to the host device, the host device may select a level of memory management desired. In so doing, the host device controls the trade-off between host device overhead of memory management and host device flexibility.

In one embodiment, a data storage device comprises: a memory device; and a controller coupled to the memory device, wherein the controller is configured to: deliver a list of supported features to a host device, wherein the list of supported features includes wear level handling, garbage collection, data-tagging, read-scrub; and update of management tables; receive a selection of the supported features from the host device; and configure the data storage device in accordance with the selected supported features. Receiving the selection of the supported features comprises receiving the selection of the supported features that the host device will manage. The received selection comprises selecting sufficient supported features for the host device to manage such that the data storage device operates as a zoned namespace (ZNS) device. The received selection comprises selecting sufficient supported features for the host device to manage such that the data storage device operates as an open channel device. The controller is configured to encode and decode data. Receiving the selection of the supported features comprises receiving the selection of the wear level handling and data-tagging that the host device will manage. The controller is configured to receive a notification from the host device that the host device would like to change the selection of the supported features. The controller is configured to wait until the data storage device is idle prior to changing the selection of the supported features.

In another embodiment, a data storage device comprises: a memory device; and a controller coupled to the memory device, wherein the controller is configured to: deliver a selection of configurations to a host device, wherein the selection of configurations includes an open channel configuration, a zone namespace (ZNS) configuration, and a configuration in between the ZNS configuration and the open channel configuration. The controller is further configured to receive a host selection of the host device managing data-tagging. The controller is further configured to receive a host selection of the host device managing wear level handling. The controller is further configured to receive a host selection of the host device managing wear level handling, garbage collection, data-tagging, read-scrub, and update of management tables. The controller is further configured to receive a host selection that the data storage device will manage wear level handling, garbage collection, data-tagging, read-scrub, and updates of management tables. The controller is configured to manage error correction codes.

In another embodiment, a data storage device comprises: a memory device; a controller coupled to the memory device; means to receive a host device instruction to configure the data storage device in a configuration selected by the host device, wherein prior to receiving the host device instruction, the data storage device is capable of operating in either of an open channel configuration, a ZNS configuration or a configuration between the open channel configuration and the ZNS configuration; and means to configure the data storage device to be able to operate the configuration selected by the host device. The data storage device further comprises means to configure the data storage device to manage garbage collection; and means to configure the data storage device to allow the host device to manage wear level handling. The data storage device further comprises means to configure the data storage device to allow the host device to manage data-tagging. The data storage device further comprises means to configure the data storage device to manage error-correction codes. The data storage device further comprises means to configure the data storage device to allow the host device to manage read-scrubbing. The data storage device further comprises means to configure the data storage device to allow the host device to manage updating management tables.

While the foregoing is directed to embodiments of the present disclosure, other and further embodiments of the disclosure may be devised without departing from the basic scope thereof, and the scope thereof is determined by the claims that follow.

What is claimed is:
1. A data storage device, comprising:
a memory device; and
a controller coupled to the memory device, wherein the controller is configured to:
deliver a list of supported features of the data storage device to a host device, wherein the list of supported features includes wear level handling, garbage collection, data-tagging, read-scrub, and update of management tables;
receive a selection of the supported features from the host device indicating which features of the supported features are going to be managed by the host device; and
configure the data storage device in accordance with the selected supported features such that the data storage device manages the features not indicated by the host device and the host device manages the features indicated by the host device.

2. The data storage device of claim 1, wherein receiving the selection of the supported features comprises receiving the selection of the supported features that the host device will manage.

3. The data storage device of claim 1, wherein the received selection comprises selecting sufficient supported features for the host device to manage such that the data storage device operates as an open channel device.

4. The data storage device of claim 1, wherein the controller is configured to encode and decode data.

5. The data storage device of claim 1, wherein receiving the selection of the supported features comprises receiving the selection of the wear level handling and data-tagging that the host device will manage.

6. The data storage device of claim 1, wherein the controller is configured to receive a notification from the host device that the host device would like to change the selection of the supported features.

7. The data storage device of claim 6, wherein the controller is configured to wait until the data storage device is idle prior to changing the selection of the supported features.

8. A data storage device, comprising:
a memory device; and
a controller coupled to the memory device, wherein the controller is configured to:
deliver a list of supported features to a host device, wherein the list of supported features includes wear level handling, garbage collection, data-tagging, read-scrub, and update of management tables;
receive a selection of the supported features from the host device; and
configure the data storage device in accordance with the selected supported features, wherein the received selection comprises selecting sufficient supported features for the host device to manage such that the data storage device operates as a zoned namespace (ZNS) device.

9. A data storage device, comprising:
a memory device; and
a controller coupled to the memory device, wherein the controller is configured to:
deliver a selection of configurations to a host device, wherein the selection of configurations includes an open channel configuration, a zone namespace (ZNS) configuration, and a configuration in between the ZNS configuration and the open channel configuration.

10. The data storage device of claim 9, wherein the controller is further configured to receive a host selection of the host device managing data-tagging.

11. The data storage device of claim 10, wherein the controller is further configured to receive a host selection of the host device managing wear level handling.

12. The data storage device of claim 9, wherein the controller is further configured to receive a host selection of the host device managing wear level handling, garbage collection, data-tagging, read-scrub, and update of management tables.

13. The data storage device of claim 9, controller is further configured to receive a host selection that the data storage device will manage wear level handling, garbage collection, data-tagging, read-scrub, and updates of management tables.

14. The data storage device of claim 9, wherein the controller is configured to manage error correction codes.

15. A data storage device, comprising:
a memory device;
a controller coupled to the memory device;
means to receive a host device instruction to configure the data storage device in a configuration selected by the host device, wherein prior to receiving the host device instruction, the data storage device is capable of operating in either of an open channel configuration, a ZNS configuration or a configuration between the open channel configuration and the ZNS configuration; and
means to configure the data storage device to be able to operate the configuration selected by the host device.

16. The data storage device of claim 15, further comprising:
means to configure the data storage device to manage garbage collection; and
means to configure the data storage device to allow the host device to manage wear level handling.

17. The data storage device of claim 16, further comprising means to configure the data storage device to allow the host device to manage data-tagging.

18. The data storage device of claim 17, further comprising means to configure the data storage device to manage error-correction codes.

19. The data storage device of claim 18, further means to configure the data storage device to allow the host device to manage read-scrubbing.

20. The data storage device of claim 19, further comprising means to configure the data storage device to allow the host device to manage updating management tables.

* * * * *